United States Patent [19]

Rumyantsev et al.

[11] 4,152,894

[45] May 8, 1979

[54] CONTROL SYSTEM OF HYDRAULIC TORQUE CONVERTER OF TRANSPORT VEHICLE

[75] Inventors: Leonid A. Rumyantsev, Moscow; Vasily T. Avershin, Bryansk; Vladimir Y. Ilnitsky, Bryansk; Ivan L. Jurin, Bryansk, all of U.S.S.R.

[73] Assignees: Tsentralny Nauchno-Issledova-Telsky Avtomobilny i. Avtomotorny Institut "Nami", Moscow; Proizvodstvennoe Ubiedinenie "Baz", Bryansk, both of U.S.S.R.

[21] Appl. No.: 852,102

[22] Filed: Nov. 16, 1977

[51] Int. Cl.² ............................................. F16D 33/02
[52] U.S. Cl. ...................................... 60/347; 60/357; 60/361; 192/3.3; 192/3.33
[58] Field of Search .......... 60/337, 338, 347, 357–362, 60/192

[56] References Cited

U.S. PATENT DOCUMENTS

| 2,717,673 | 9/1955 | Zeidler | 192/3.3 |
| 3,415,345 | 12/1968 | Cadiou | 192/333 |

Primary Examiner—Edgar W. Geoghegan
Attorney, Agent, or Firm—Fleit & Jacobson

[57] ABSTRACT

A control system of the hydraulic torque converter of a transport vehicle wherein the space formed by the converter wheels and the space of the coupling which locks said wheels are in communication, through a change-over valve actuated by a signal of the RPM transmitter of the engine shaft of the transport vehicle, with the discharge line of the pump, said line communicating with the source of fluid via a reducing valve. The system incorporates an auxiliary pump whose discharge line communicates with the discharge line of said pump through a check valve and, through a valve actuated by the pressure of fluid contained in the space of the locking coupling, with the source of fluid.

2 Claims, 3 Drawing Figures

CONTROL SYSTEM OF HYDRAULIC TORQUE CONVERTER OF TRANSPORT VEHICLE

The present invention relates to transport vehicles and more particularly, to the control systems of hydraulic torque converters used in transport vehicles.

PRIOR ART DEVICE AND ITS DISADVANTAGES

Known in the prior art are the control systems of hydraulic torque converters used in transport vehicles wherein the space of the torque converter and the space of the locking coupling of its impeller and turbine wheels are communicated through a changeover valve with the discharge line of the pump driven by the engine of the vehicle.

The changeover valve is controlled by the signals of the engine RPM transmitter of the transport vehicle. Besides, the discharge line of the pump is communicated through a reducing valve with a source of fluid.

In these control systems the rate of fluid flow through the discharge line of the pump depends on the rotation speed of the engine crankshaft irrespective of the operation of the torque converter or its impeller and turbine wheels rigidly connected with the locking coupling, and the pressure maintained by the reducing valve remains constant. In these control systems the rate of fluid flow for filling and cooling the torque converter is somewhat higher than required for filling the locking coupling in order to engage it and keep engaged. Thus, the power spent for the functioning of the control system with the torque converter locked exceeds the normally required limit, which is certainly objectionable.

OBJECTS AND BRIEF DESCRIPTION OF THE INVENTION

An object of the present invention resides in decreasing the expenditures of power required for the functioning of the control system of a hydraulic torque converter of a transport vehicle in the course of converter locking.

Another object resides in decreasing the dynamic loads in the power transmission of the transport vehicle during engagement of the locking coupling of the torque converter.

In accordance with these and other objects we hereby disclose a control system of a hydraulic torque converter of a transport vehicle in which the space formed by the converter wheels and the space of the coupling which locks these wheels are in communication, through a changeover valve actuated by a signal of the engine RPM transmitter of the transport vehicle, with the discharge line of the pump, said line communicating via a reducing valve with a fluid source wherein, according to the invention, the control system incorporates an auxiliary pump whose discharge line is communicated with the discharge line of said pump through a nonreturn valve whilst its communication with the source of fluid is through the valve actuated by the pressure of the fluid contained in the space of the locking coupling.

It is expedient that the movable elements of the reducing valve and those of the valve actuated by the pressure of the fluid contained in the locking coupling should be connected by a flexible link.

Such a connection of the movable elements of said valves provides for changing the fluid pressure in the converter locking coupling in the course of converter locking and for decreasing the dynamic loads in the power transmission of the transport vehicle.

The control system of the torque converter of a transport vehicle according to the invention requires a comparatively low power for its functioning, ensures various fluid pressures in the discharge line during operation of the converter and during its locked mode which aids in reducing the dynamic loads aplied to the power transmission of transport vehicles in the course of engagement of the locking coupling.

BRIEF DESCRIPTION OF DRAWINGS

Given below is a detailed description of the invention by way of example with reference to the accompanying drawings, in which.

DETAILED DESCRIPTION OF EMBODIMENT OF INVENTION

Figure 1:
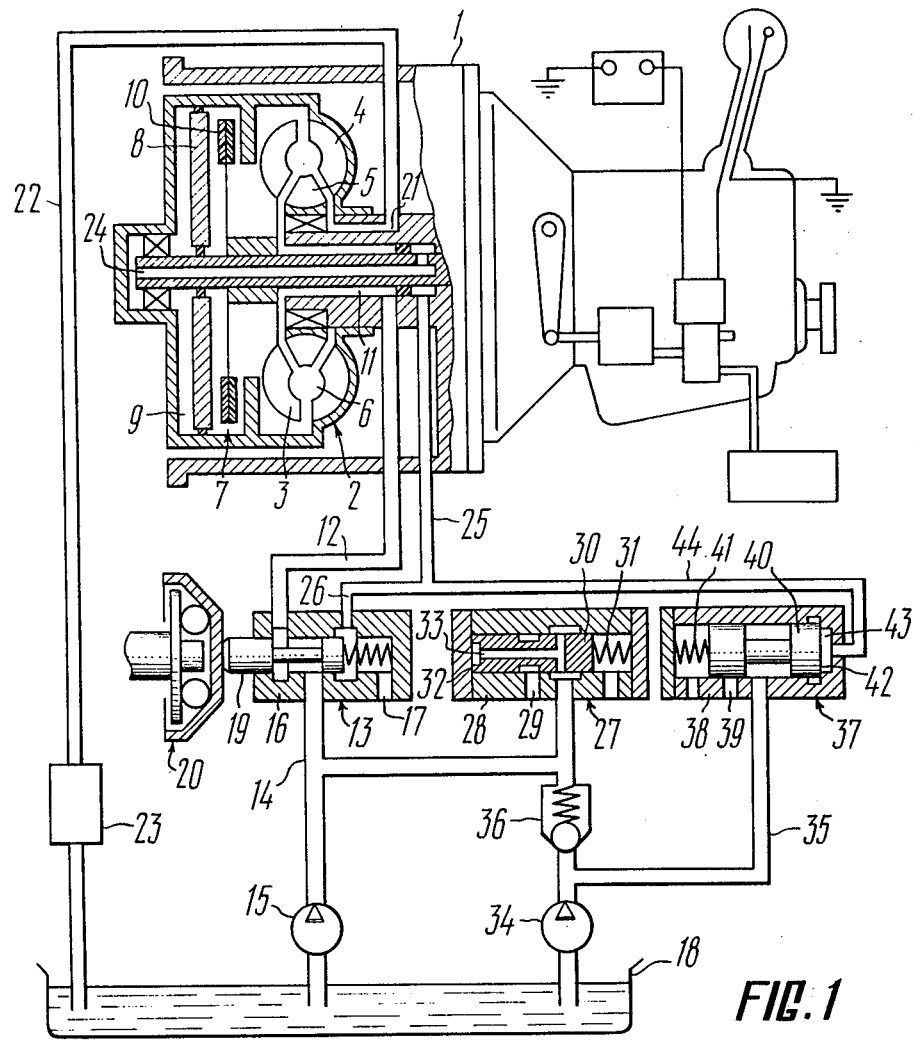
FIG. 1 is a schematic view of the control system of a hydraulic torque converter of a transport vehicle according to the invention.

The control systems comprises a hydraulic torque converter 2 (FIG. 1) mounted in a casing 1 and driven by the engine (not shown in the drawing) of the transport vehicle. The turbine and impeller wheels 3 and 4 as well as the stator wheel 5 of the torque converter 2 from a space 6. Mounted in the impeller wheel 4 is a locking coupling 7 which locks the impeller wheel 4 and the turbine wheel 3. The pressure element 8 of the coupling 7 together with the impeller wheel 4 forms the space 9 of the locking coupling 7. The friction disc 10 of the locking coupling 7 is mounted on the turbine wheel 3 with a provision for moving relative thereto in an axial direction when it is acted upon by the pressure element 8.

The space 6 of the hydraulic torque converter 2 is connected by a channel 11 and oil pipe 12 through a changeover valve 13 with the discharge line 14 of the pump 15. The body 16 of the change-over valve 13 has a hole 17 for putting its space in communication with the source of fluid 18 and a slide valve 19 actuated by a signal of the engine RPM transmitter 20 of the transport vehicle. The space 6 of the hydraulic torque converter 2 is communicated through a channel 21 and oil pipe 22 and through an oil cooler 23 with the source 18 of fluid.

The space 9 of the locking coupling 7 is communicated through a channel 24 and oil pipes 25 and 26 via the changeover valve 13 with the discharge line 14 of the pump 15. It will be appreciated that the flow between space 9 and channel 24 is around or through the bearing structure supporting one end of the member containing channel 24. Said line 14 is connected through a reducing valve 27 with the fluid source 18. The body 28 of the reducing valve 27 has a hole 29 connecting the space of this valve with the fluid source 18, and a movable link 30 loaded in an axial direction by a spring 31. The end 32 of the movable link 30 has an axial drilling 33 for admitting fluid to the link end 32.

The control system incorporates an auxiliary pump 34 whose discharge line 35 is communicated through a check valve 36 with the discharge line 14 of the pump 15. The forcing line 35 is communicated with the fluid source 18 through the valve 37 which is actuated by the pressure of the fluid contained in the space 9 of the locking coupling 7. The body 38 of the valve 37 has a hole 39 which connects its space with the fluid source 18 and incorporates a movable link 40 loaded axially by a spring 41. Between the end 42 of the movable link 40 and the body 38 there is a space 43. Said space 43 is communicated through an oil pipe 44, oil pipe 25 and the channel 24 with the space 9 of the locking coupling 7 of the hydraulic torque converter 2. When the discharge line 14 of the pump 15 is put in communication with the oil pipe 26, the fluid flows through the oil pipe 44 into the space 43, the movable link 40 moves to the left (in the drawing) and thus communicates the discharge line 35 of the auxiliary pump 34 through the hold 39 with the fluid source 18. As a result, the nonreturn valve 36 is closed, the supply of fluid from the pump 34 into the space 9 of the converter locking coupling 7 is cut off and this reduces the amount of power consumed by the control system.

Figure 2:
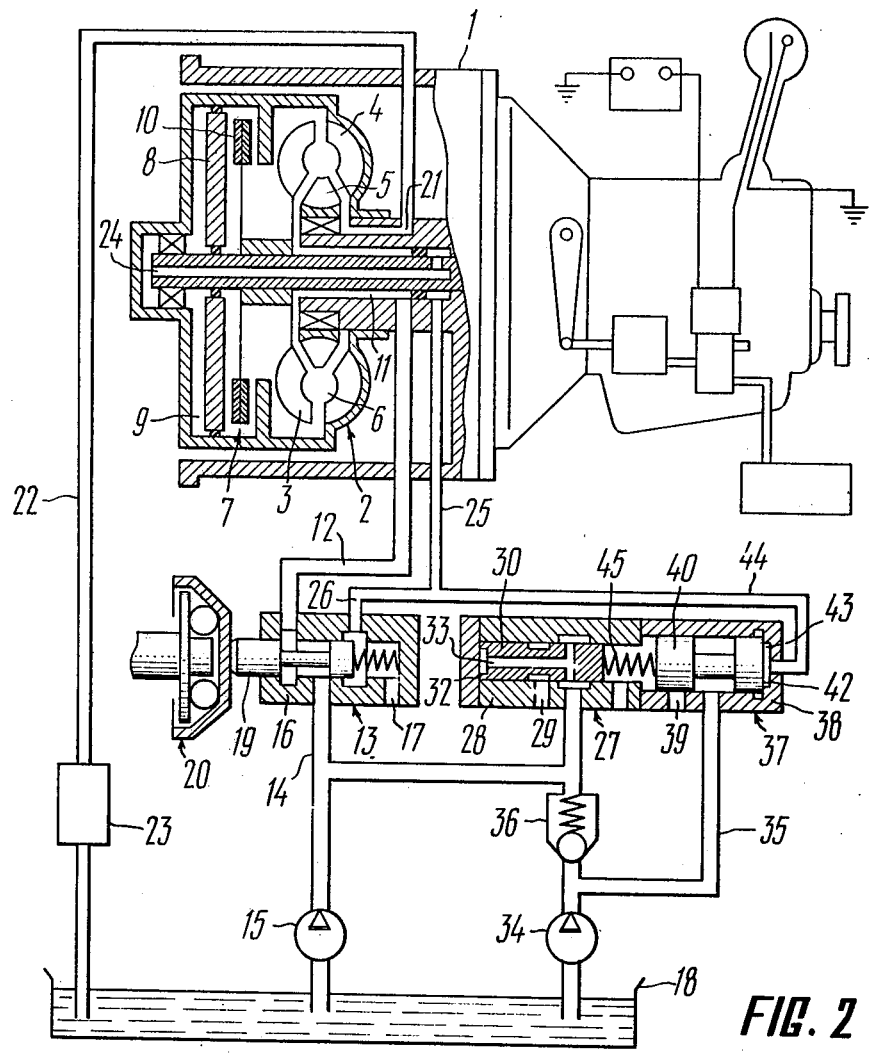
FIG. 2 shows schematically the control system according to the invention wherein the movable elements of the reducing valve and of the valve actuated by the pressure of the fluid contained in the locking coupling are interconnected by a flexible link.

In the control system illustrated in FIG. 2 the bodies 28 and 38 of the valves 27 and 37, respectively, are rigidly connected to each other whereas the movable links 30 and 40 are interconnected by a flexible link 45. The diameter of the movable link 40 is larger than that of the movable link 30.

such a layout of the control system allows the fluid pressure maintained by the reducing valve 27 to be changed as the pressure element 8 of the locking coupling 7 moves, which aids in decreasing the dynamic loads in the power transmission of a transport vehicle during engagement of the coupling 7 for locking the converter wheels 3 and 4.

The control system of the hydraulic torque converter of a transport vehicle functions as follows.

The impeller wheel 4 of the torque converter 2 is driven by the engine of the vehicle. During rotation of the impeller wheel 4 the fluid contained in the space 6 of the torque converter 2 starts moving and sets in rotation the turbine wheel 3 of the converter 2. Inasmuch as the stator wheel 5 of the converter 2 is connected to the casing 1, there takes place the conversion of torque which is accompanied by heating of the torque converter 2.

In order to cool the torque converter and maintain a prest overpressure therein, the fluid flows from the enginedriven pumps 15 and 34 into the discharge line 14. From the pump 34 it flows through the check valve 36. From the discharge line 14 the fluid flowing through the changeover valve 13 gets into the oil pipe 12, channel 11 and further into the space 6 of the torque converter 2. From said space 6 the fluid flows through the channel 21 and the oil pipe 22 into the oil cooler 23 and then, into the fluid source 18.

The required fluid pressure is maintained by the reducing valve 27 in which case the fluid flows through the drilling 33 to the end 32 of the movable element 30 and, overriding the spring 31 in FIG. 1 or 45 in FIG. 2, tends to shift the movable link 30 to the right (in the drawing). When the preset pressure of fluid is exceeded, the movable link 30 moves sufficiently far so that the discharge line 14 is put in communication with the fluid source 18 through the hole 29.

Thus, the reducing valve 27 controlling the discharge of the fluid through the hole 29 ensures an approximately constant pressure in the discharge line 14, the value of said pressure depending on the force of the flexible link 31 (FIG. 1) or 45 (FIG. 2).

Owing to the overpressure of the fluid contained in the space 6 of the torque converter, the pressure element 8 is withdrawn from the friction disk 10 to the left (in the drawing) and the space 9 of the locking coupling 7 of the torque converter 2 communicates with the fluid source 18 through the channel 24, oil pipes 25 and 26 and through the hole 17 in the changeover valve 13.

As the engine of the transport vehicle is accelerated, the transmitter 20 moves the slide valve 19 to the right, thereby putting the discharge line 14 in communication with the oil pipe 26. In this case the fluid flows through the oil pipes 26 and 25 and through the channel 24 into the space 9 of the locking coupling 7 of the torque converter 2. The pressure element 8 moves to the right and presses the friction disc 10 against the impeller wheel 4 thus locking the impeller and turbine wheels 4 and 3.

The fluid flows also through the oil pipes 26 and 44 into the space 43 and, acting on the link end 42, moves the movable link 40 to the left. This puts the discharge line 35 in communication with the fluid source 18 through the hole 39. The pressure of the fluid in the discharge line 35 drops sharply and the check valve 36 closes. Now the control system functions only due to the operation of the pump 15. Thus, in view of the fact that the pressure of the fluid in the forcing line 35 is lower than that in the discharge line 14, the power required for the operation of the converter control system becomes smaller.

In the control system of FIG. 2 in which the movable links 30 and 40 of the valves 27 and 37 are connected to each other by the flexible link 45 the fluid entering the space 43 acts on the link end 42 and starts shifting the movable link 40 to the left. As said link 40 moves to the left, the flexible link 45 is additionally compressed which causes a pressure rise in the discharge line 14 and, consequently, in the space 9 of the locking coupling 7 of the torque converter 2.

The fluid delivered by the pump 34 into the forcing line 35 flows through the hole 39 into the fluid source 18.

Figure 3:
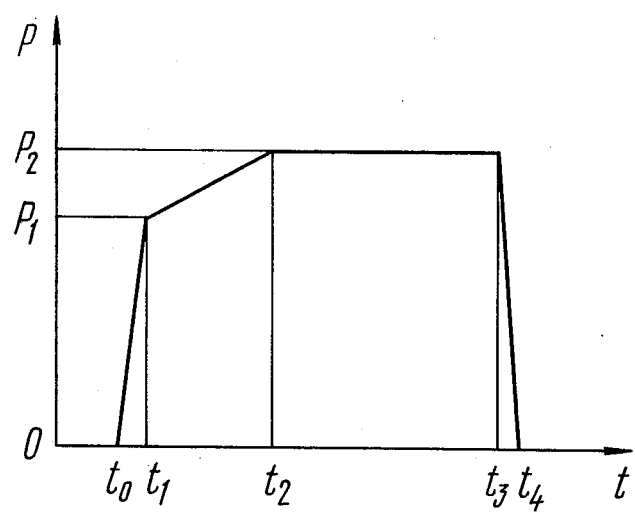
FIG. 3 is a chart showing the changes in the pressure of fluid in the locking coupling.

Change of pressure P in the space 9 of the converter locking coupling 7 during its engagement and disengagement is shown in FIG. 3 by the coordinates P = fluid pressure and T = time. The time $t_o$ refers to the start of engagement of the coupling 7. Within the period of time $t_1 - t_o$ the space 9 of the coupling 7 is filled with fluid and pressure in it rises to a value at which the movable link 40 occupies the extreme right position.

Within the time period $t_2 - t_1$ the movable link 40 moves to the extreme left position which causes an additional loading of the flexible link 45 with resultant gradual increase of pressure in the space 9 of the coupling 7 from $P_1$ to $P_2$.

Owing to the gradual change of pressure in the space 9 from $P_1$ to $P_2$, the locking coupling 7 becomes smoothly engaged which rules out the dynamic loads in the power transmission of the transport vehicle.

In the time period $t_3 - t_2$ the transport vehicle moves with the torque converter locked. In the period $t_4 - t_3$ the locking coupling 7 is disengaged. The law of pressure changes in the space 9 of the converter locking coupling 7 shown in FIG. 3 is possible when the movable links 30 and 40 are connected by the flexible link 45.

Thus, locking of the torque converter 2 begins at a lower fluid pressure and ends at a higher pressure which is conducive to a reduction of dynamic loads in the hydraulic torque converter and in the power transmission of the transport vehicle.

While the present invention has been disclosed and illustrated by the preferable embodiments, it should be understood that it is not confined to these examples only so that various modifications and changes within the spirit and the scope of the invention may occur to those skilled in the art.

These changes and modifications can be resorted to without departing from the function or the scope of the invention as hereinafter defined by the appended claims.

We claim:

1. A control system of a hydraulic torque converter of a transport vehicle comprising: an impeller wheel, a turbine wheel, a first space formed by said impeller and turbine wheels; a coupling for locking said impeller and turbine wheels and having a second space defined therein; a pump; a fluid source communicating with the inlet of said pump; a first discharge line one end of which is connected to the outlet of said pump while the other end communicates with both said first space formed by said impeller and turbine wheels and said second space in said locking coupling; a changeover valve mounted in said first discharge line; the engine of said transport vehicle having a shaft and an RPM transmitter indicating the rotational speed of said shaft and linked kinematically with said changeover valve for selective communication of said spaces with said first discharge line depending on the rotational speed of the shaft of said engine; a reducing valve mounted in said first discharge line and intended to put it in communication with the source of fluid; an auxiliary pump; said fluid source communicating with the inlet of said auxiliary pump; a second discharge line of said auxiliary pump, one end of which is connected to the outlet of said auxiliary pump while its other end is connected to said first discharge line of said pump; a nonreturn valve mounted in said second discharge line of said auxiliary pump; a valve mounted in said second discharge line of said auxiliary pump, actuated by the pressure of the fluid contained in said second space of said locking coupling of said impeller and turbine wheels and communicating said second discharge line of said auxiliary pump with said source of fluid.

2. A control system according to claim 1 wherein said reducing valve and said valve actuated by the pressure of the fluid contained in the second space of the locking coupling have movable links interconnected by a flexible link.

* * * * *